(12) United States Patent
Yerushalmy et al.

(10) Patent No.: US 10,904,512 B2
(45) Date of Patent: Jan. 26, 2021

(54) COMBINED STEREOSCOPIC AND PHASE DETECTION DEPTH MAPPING IN A DUAL APERTURE CAMERA

(71) Applicant: Corephotonics Ltd., Tel-Aviv (IL)

(72) Inventors: Ido Yerushalmy, Tel-Aviv (IL); Noy Cohen, Tel-Aviv (IL); Ephraim Goldenberg, Ashdod (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 15/753,281

(22) PCT Filed: Sep. 6, 2017

(86) PCT No.: PCT/IB2017/055380
§ 371 (c)(1),
(2) Date: Feb. 17, 2018

(87) PCT Pub. No.: WO2019/048904
PCT Pub. Date: Mar. 14, 2019

(65) Prior Publication Data
US 2020/0221064 A1     Jul. 9, 2020

(51) Int. Cl.
*H04N 13/20* (2018.01)
*H04N 13/239* (2018.01)
(Continued)

(52) U.S. Cl.
CPC ........... *H04N 13/239* (2018.05); *G06T 7/593* (2017.01); *H04N 13/133* (2018.05); *H04N 2013/0081* (2013.01)

(58) Field of Classification Search
CPC ............... H04N 13/239; H04N 13/133; H04N 2013/0081; G06T 7/593
See application file for complete search history.

(56) References Cited

U.S. PATENT DOCUMENTS

| 4,199,785 A | 4/1980 | McCullough et al. |
| 5,005,083 A | 4/1991 | Grage et al. |

(Continued)

FOREIGN PATENT DOCUMENTS

| CN | 101276415 A | 10/2008 |
| CN | 201514511 U | 6/2010 |

(Continued)

OTHER PUBLICATIONS

International Search Report and Written Opinion issued in related PCT patent application PCT/IB2017/055380, dated Jan. 26, 2018. 7 pages.

(Continued)

*Primary Examiner* — Qian Yang
(74) *Attorney, Agent, or Firm* — Nathan & Associates; Nathan Menachem

(57) ABSTRACT

In an imaging system having a first camera with a first field of view (FOV) and a second camera with a second FOV smaller than the first FOV, wherein the first and second FOVs overlap over an overlap region, a method for calculating a calibrated phase detection depth map over the entire first FOV comprises calculating a stereoscopic depth map in the overlap region using image information provided by the first and second cameras, obtaining a first camera phase detection (PD) disparity map in the entire first FOV, and using the stereoscopic depth map in the overlap region to provide a calibrated 2PD depth map in the entire first FOV.

9 Claims, 5 Drawing Sheets

(51) Int. Cl.
  *G06T 7/593* (2017.01)
  *H04N 13/133* (2018.01)
  *H04N 13/00* (2018.01)

(56) References Cited

U.S. PATENT DOCUMENTS

| | | |
|---|---|---|
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 3,274,552 A1 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,392,188 B2 | 7/2016 | Shabtay et al. |
| 9,413,930 B2 | 8/2016 | Geerds |
| 9,413,972 B2 | 8/2016 | Shabtay et al. |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0247522 A1 | 10/2007 | Holliman |
| 2007/0257184 A1 | 11/2007 | Olsen et al. |
| 2007/0285550 A1 | 12/2007 | Son |
| 2008/0017557 A1 | 1/2008 | Witdouck |

(56) References Cited

U.S. PATENT DOCUMENTS

| | | |
|---|---|---|
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0188736 A1 | 8/2011 | Xu |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahl et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0146029 A1 | 5/2015 | Venkataraman et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0118399 A1 | 4/2017 | Kim et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2019/0121103 A1 | 4/2019 | Bachar et al. |

FOREIGN PATENT DOCUMENTS

| | | |
|---|---|---|
| CN | 102739949 A | 10/2012 |
| CN | 103024272 A | 4/2013 |
| CN | 103841404 A | 6/2014 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |

(56) References Cited

FOREIGN PATENT DOCUMENTS

| | | |
|---|---|---|
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2010204341 A | 9/2010 |
| JP | 2011085666 A | 4/2011 |
| JP | 2013106289 A | 5/2013 |
| KR | 20070005946 A | 1/2007 |
| KR | 20090058229 A | 6/2009 |
| KR | 20100008936 A | 1/2010 |
| KR | 20140014787 A | 2/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

Statistical Modeling and Performance Characterization of a Real-Time Dual Camera Surveillance System, Greienhagen et al., Publisher: IEEE, 2000, 8 pages.
A 3MPixel Multi-Aperture Image Sensor with 0.7 µm Pixels in 0.11 µm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera an-ay, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 9 pages.
Superimposed multi-resolution imaging, Caries et al., Publisher: Optical Society of America, 2017, 13 pages.
Viewfinder Alignment, Adams et al., Publisher: EUROGRAPHICS, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.

KNOWN ART

KNOWN ART

KNOWN ART

| -1 | -3 | 1 | 3 | 1 |
|----|----|----|----|----|
| -2 | 0 | 0 | 0 | -3 |
| 1 | 0 | 0 | 0 | -2 |
| 2 | 0 | 0 | 0 | 4 |
| 2 | 1 | -1 | -3 | 1 |

| 10 | 0 | 25 | 35 | 25 |
|----|----|----|----|----|
| 5 | 20 | 20 | 20 | 0 |
| 25 | 20 | 20 | 20 | 5 |
| 30 | 20 | 20 | 20 | 50 |
| 30 | 25 | 10 | 0 | 25 |

KNOWN ART

KNOWN ART

COMBINED STEREOSCOPIC AND PHASE DETECTION DEPTH MAPPING IN A DUAL APERTURE CAMERA

CROSS-REFERENCE TO RELATED APPLICATIONS

This application is a 371 National Phase application from international application PCT/IB2017/055380 filed Sep. 6, 2017.

FIELD

Embodiments disclosed herein relate in general to digital cameras and in particular to dual-aperture digital cameras.

BACKGROUND

Digital camera modules are currently being incorporated into a variety of host devices. Such host devices include cellular telephones (e.g. smartphones), personal data assistants (PDAs), computers, and so forth. Some of these host devices include two or more digital camera modules (also referred to as optical imaging sub-systems or "sub-cameras"). When two such modules are used for example as "back" cameras in a smartphone, the back cameras provide a dual-aperture imaging system, also referred to a "dual-aperture camera". A number of smartphone manufacturers already include dual-aperture cameras in their products.

Dual-aperture cameras disclosed by at least some of the present inventors may be found for example in U.S. Pat. Nos. 9,185,291, 9,392,188 and 9,413,972. In a dual-aperture digital camera, each sub-camera includes one or more lenses and/or other optical elements which define an aperture such that received electro-magnetic radiation is imaged by the optical sub-system and a resulting image is directed towards a two-dimensional (2D) pixelated image sensor region. The image sensor (or simply "sensor") region is configured to receive the image and to generate a set of image data based on the image. The digital camera may be aligned to receive electromagnetic radiation associated with scenery having a given set of one or more objects. The set of image data may be represented as digital image data, as well known in the art. Hereinafter in this description, "image" "image data" and "digital image data" may be used interchangeably. Also, "object" and "scene" may be used interchangeably. As used herein, the term "object" is an entity in the real world imaged to a point or pixel in the image.

A sensor and its associated lens form a lens/sensor combination. The two lenses of a dual-aperture camera have different focal lengths. Thus, even though each lens/sensor combination is aligned to look in the same direction, each captures an image of the same subject but with two different fields of view (FOVs). In such cases, one camera and its lens and sensor are commonly called "Wide" and the other camera and its sensor and lens are commonly called "Tele". Each sensor provides a separate image, referred to respectively as "Wide" (or "W") and "Tele" (or "T") images. A Wide image reflects a wider FOV (marked $FOV_W$) than a Tele image (where the FOV is marked $FOV_T$). The Wide image also has lower resolution than the Tele image.

Depth maps and associated methods to obtain such maps using multi-cameras (and in particular dual-aperture cameras) are known. A depth map is a rendition of depth values for all the pixels in an image. If one can calculate the depth value of each pixel, then in essence one gets a depth map. The depth map can be extracted or calculated from a disparity map (a rendition of disparity for each pixel) plus from additional information discussed below.

A depth map obtained with a dual-aperture camera is referred to as "stereoscopic" depth map. In some dual-aperture cameras, one ("reference") camera is equipped with a Wide lens and with a Phase-Detection (PD) sensor. The second camera is equipped with a Tele lens, so that the overlapping field of view of the two cameras is partial relative to the FOV reference camera. The region of the Tele FOV that overlaps the Wide FOV is referred to as "overlap region". All regions in the Wide FOV that are not overlapped by the Tele FOV are referred to as "non-overlap regions". Alternatively, in some embodiments both cameras may be equipped with a 2PD sensor, i.e. a sensor in which each sensor pixel is divided into 2 sub-pixels and supports depth estimation via calculation of disparity between the image produced by all the right sub-pixels and that produced by all left sub-pixels. PD sensors take advantage of multiple micro-lenses (or partially covered micro-lenses) to detect pixels in and out of focus. Micro-lenses are calibrated so that objects in focus are projected onto the sensor plane at the same location relative to the lens, see FIG. 1.

FIG. 1 shows a point object 102 in focus, with a micro-lens projecting the light from the object onto the center of two sub-pixels, causing zero-disparity. FIG. 2 shows light-rays from a point object 202 out of focus. The left micro-lens projects the light from the object onto the center of the left sub-pixel. The right micro-lens projects the same object onto the right sub-pixel, causing a positive disparity value of 2, which is not directly related to the true distance of the object from the sensor. Objects before/after the focal plane are projected to different locations relative to each lens, creating a positive/negative disparity between the projections. As stated above, this disparity is zero for the focal plane and increases in magnitude as the object moves further away from that plane. The 2PD disparity information can be used to create a "2PD depth map". Note that this 2PD depth map is both crude (due to a very small baseline) and relative to the focal plane. That is, zero-disparity is detected for objects in focus, rather than for objects at infinity.

All known methods to obtain depth maps using dual or multi-aperture cameras suffer from the problem that while the depth map is accurate in an overlap region, it is inaccurate in the non-overlap region. For camera arrays where the FOV of the modules is different (e.g. dual- or multi-aperture cameras with Wide and Tele lenses), a fine and absolute depth map can be extracted only for the overlap region using mainly the stereoscopic information. No absolute depth map can be obtained for the non-overlap regions. There is therefore a need for and it would be advantageous to have systems and methods to extend the absolute depth information to the non-overlap regions as well. Further, it would be advantageous to enhance the accuracy of the depth map in the overlap region, by relying on additional information from 2PD sensor(s).

SUMMARY

In an exemplary embodiment there is provided a method comprising providing an imaging system having a first camera with a first FOV and a second camera with a second FOV smaller than the first FOV, wherein the first FOV and the second FOV overlap over an overlap region, calculating a stereoscopic depth map in the overlap region using respective image information provided by the first and second cameras, obtaining a first camera 2 sub-pixel phase detection (2PD) disparity map in the entire first FOV, and improving the stereoscopic depth map or the 2PD depth map in at least the overlap region using the stereoscopic depth map in the overlap region and/or the first camera 2PD disparity map in the entire first FOV.

In an exemplary embodiment, the improving the stereoscopic depth map or the 2PD depth map in at least the overlap region includes using the stereoscopic depth map in the overlap region and/or the first camera 2PD disparity map in the entire first FOV to provide a calibrated 2PD depth map in the entire first FOV.

In an exemplary embodiment, the calculating a stereoscopic depth map in the overlap region includes calculating an absolute stereoscopic depth map in the overlap region.

In an exemplary embodiment, the calculating an absolute stereoscopic depth map in the overlap region includes cropping the image information provided by the first camera to match the second FOV so that disparity at infinity is zero.

In an exemplary embodiment, the using the stereoscopic depth map in the overlap region and the first camera 2PD disparity map in the entire first FOV to provide a calibrated PD depth map in the entire first FOV includes converting disparities in the first camera 2PD disparity map in the entire first FOV from pixel units into calibrated physical units based on the calibrated result of a stereo disparity.

In an exemplary embodiment, the improving the stereoscopic depth map or the 2PD depth map in at least the overlap region includes using the 2PD depth map to improve the stereoscopic depth map in the overlap region.

In an exemplary embodiment, the obtaining a 2PD depth map in the entire first FOV includes obtaining the 2PD depth map using a first camera image sensor.

In an exemplary embodiment, the obtaining a 2PD depth map in the entire first FOV includes obtaining the 2PD depth map using a first camera image sensor and a second camera image sensor.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals. Elements in the drawings are not necessarily drawn to scale.

FIG. 3 shows an exemplary baseline ($d_1$) between two cameras used for stereoscopic depth calculation;

DETAILED DESCRIPTION

Figure 6:
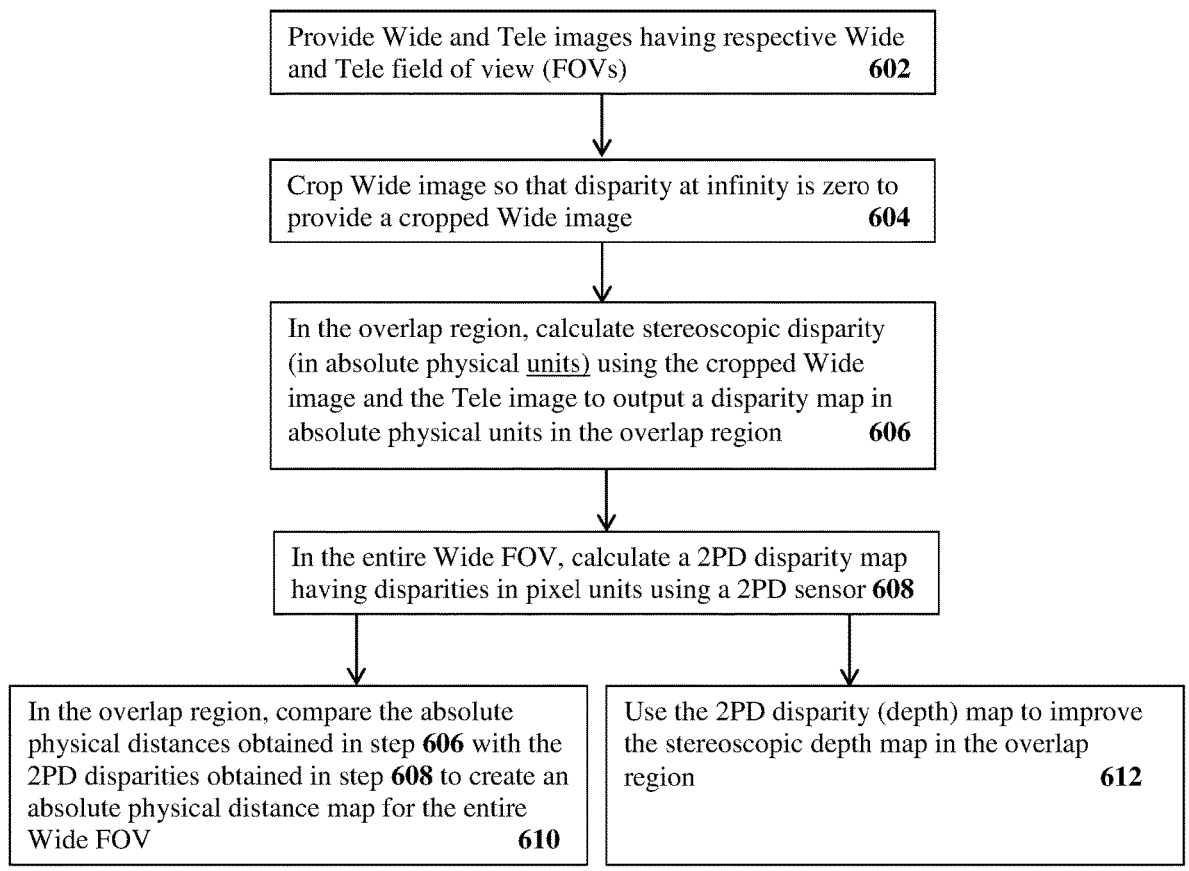
FIG. 6 shows in a flow chart an exemplary embodiment of a method disclosed herein.

An exemplary embodiment of a method to extend the absolute depth information obtained by stereoscopic vision in the overlap region to the non-overlap region as well is described next, with reference to FIG. 6. In the exemplary embodiment, the method includes:

In a step 602, provide Wide and Tele images having respective Wide and Tele field of view (FOVs)

In a step 604, crop the Wide image so that disparity at infinity is zero to provide a cropped Wide image. This prepares the Wide camera image for depth calculation.

Figure 1:
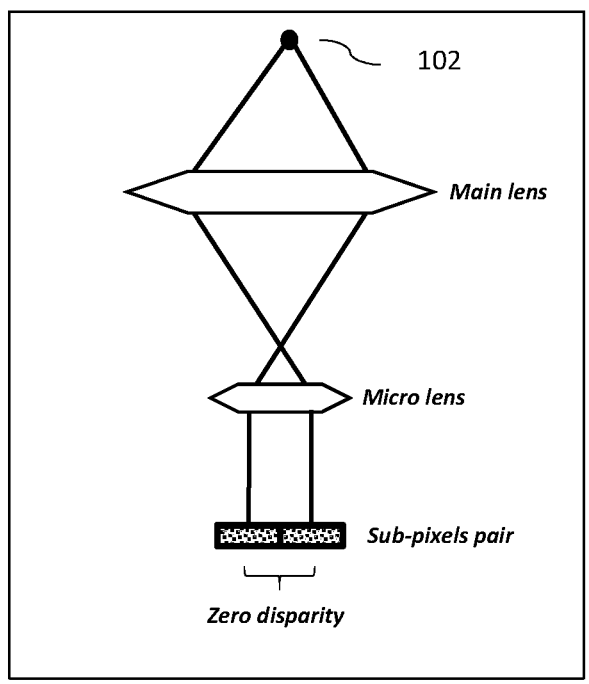
Figure 2:
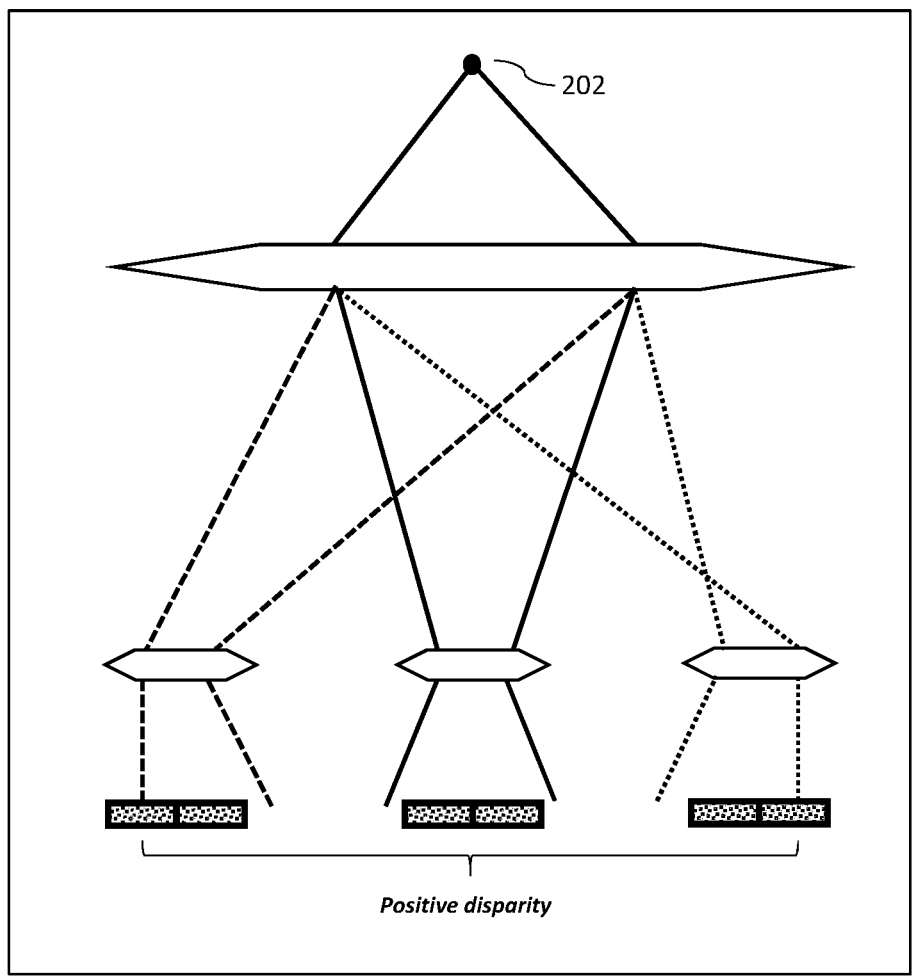
FIG. 2 shows an object in focus, with a micro-lens projecting the light from the object onto the center of two sub-pixels, causing zero-disparity.
Figure 3:
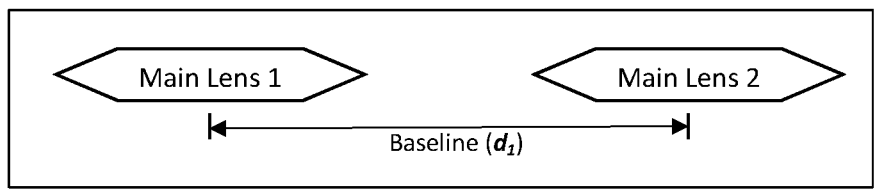
FIG. 3 shows an object out of focus, with a left micro-lens projecting the light from the object onto the center of the left sub-pixel and a right micro-lens projecting the same object onto the center of the right sub-pixel, causing a positive disparity value of 2, which has no physical meaning of the true object distance.

In a step 606, calculate stereoscopic disparity (in absolute physical units) in the overlap region using the cropped Wide image and the Tele image to output a disparity map in absolute physical units in the overlap region. Such a disparity map has zero-disparity at infinity and in general follows equation 1:

$$Z = \sqrt{\frac{F_{wide} * d_1}{D_1}} \quad (1)$$

where Z is the reference (in this case Wide) camera-to-object distance in physical units (e.g. in mm), $F_{wide}$ the focal length of the Wide camera, $d_1$ the distance between the centers of the main lenses (baseline) and $D_1$ is the disparity in pixels (see FIG. 3 for more details). For example, $d_1$=10 mm. Equation 1 provides stereoscopic conversion from disparity in pixel units to distance in physical units. Note that this equation is true for optimal conditions, which can be obtained by applying a known calibration process.

Figures 4, 5:
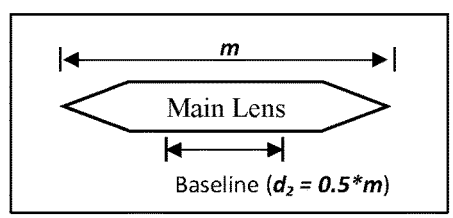
FIG. 4 shows on the left an exemplary disparity map obtained from the 2PD sensor and on the right the disparity map for the same image generated using a stereoscopic method.
FIG. 5 shows an exemplary baseline ($d_2$) used for 2PD depth calculation.

In a step 608, calculate a 2PD disparity map with disparities in pixel units in the entire Wide FOV using a 2PD sensor. FIG. 4 shows on the left an exemplary 2PD disparity map obtained from a 2PD sensor: the central region (marked with dots) is in focus and thus has zero disparity (pixel units). Other pixels have different disparity values, i.e. are out of focus, but their camera-to-object distance is unknown. On the right, FIG. 4 shows a disparity map for the same image generated using a known stereoscopic method the disparity in pixels is zero for objects at infinity and increases as the object distance from the camera decreases. Thus, the 2PD disparity values can be converted to the physical camera-to-object distances. Disparities in the stereoscopic map are much larger, as the baseline is larger ($d_2 < d_1$).

The 2PD disparities may be converted from pixel units to distance in physical units using Equation 2.

$$Z = \sqrt{\frac{F_{wide} * d_2}{D_{infinity} - D_2}} \quad (2)$$

where Z is the camera-to-object distance in physical units (e.g. mm), $F_{wide}$ the focal length of the Wide camera, $d_2$ is approximately equal to 0.5×m where m is the diameter of the wide camera lens aperture and, $D_{infinity}$ is the disparity of objects at infinity and $D_2$ the disparity in pixels, dependent on focal position (see FIG. 5 for more details). For example, m=2 mm. Note that $D_{infinity}$ depends on the focus position.

In a step 610, compare the absolute stereoscopic physical distances obtained in step 606 with the 2PD disparities obtained in step 608 in the overlap region to create an absolute physical distance map for the entire Wide FOV For a given pixel in the overlap region, its camera-to-object distance in physical units (Z), should be identical for both (stereoscopic and 2PD) methods Based on equation 1 and equation 2, $D_{infinity}$ is found using equation 3:

$$D_{infinity} = \frac{d_2 * D_1}{d_1} + D_2 \quad (3)$$

Using $D_{infinity}$, the disparities in the non-overlap region can now be converted into calibrated physical units, by applying equation 2.

Figure 7:
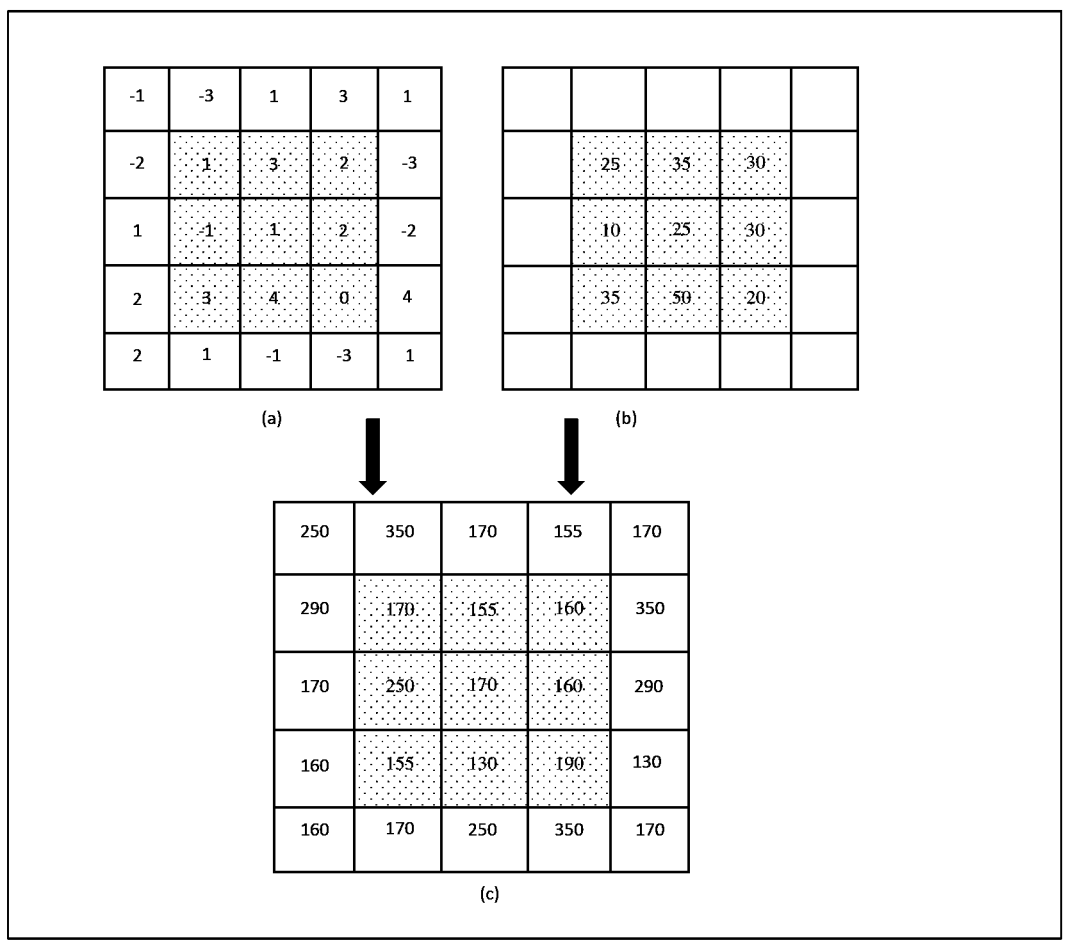
FIG. 7 shows in (a) an exemplary disparity map for an image generated using a 2PD sensor and on the right, in (b) the disparity map for the same image generated using a stereoscopic method, and in (c) a calibrated result with physical distance units as produced by the method described in the flow chart of FIG. 6.

FIG. 7 shows in (a) an exemplary disparity map for an image generated using a 2PD sensor and in (b) the disparity map for the same image generated using a stereoscopic method. Both (a) and (b) show disparities (offsets) in units of pixel. FIG. 7 shows in (c) a calibrated depth map obtained over the entire Wide FOV with a method disclosed herein, with physical distance units (e.g. cm). The dotted areas in (a), (b) and (c) represent the overlap region.

Alternatively or in addition to the extension of the absolute depth information obtained by stereoscopic vision in the overlap region to the non-overlap region, one may use the 2PD disparity map from step 608 above to enhance the result of stereoscopic disparity, step 612. The 2PD disparities may be obtained from the Wide camera alone, of from both the Wide and Tele cameras. The 2PD disparity map can be used to define a local search range for the stereoscopic algorithm. 2PD disparity can be calculated along a vertical (e.g. Y) axis, while stereoscopic disparity can be calculated along a horizontal (e.g. X) axis, or vice-versa (depending on hardware assembly). Objects lying along a single axis will be better detected by one calculation than by the other (i.e. by 2PD disparity vs. stereoscopic disparity or vice versa). Such objects are detected and greater reliability is assigned to the appropriate choice.

The level of disagreement between the depth calculated by the 2PD disparity and the depth calculated by stereoscopic disparity algorithms can be used as a reliability measure per pixel. For example, after the calibration of the 2PD disparity map (using steps 600-610 above for the overlap region only), one may compare the depth calculated by both methods. In case of significant disagreement (for example, if the stereoscopic disparity method can reach an accuracy of ±1 pixel, "significant disagreement" may be defined as more than 2 pixels), this depth value can be considered unreliable and marked as an outlier.

In conclusion, using either steps 600-610 or steps 600-608 plus the enhancement of stereoscopic disparity described above, the entire FOV of the Wide camera will have absolute disparity values (i.e. true physical distance to an object), with the overlap region obtaining these absolute values from the stereoscopic+2PD values and the non-overlap region obtaining these absolute values based on Equation 3.

While this disclosure has been described in terms of certain embodiments and generally associated methods, alterations and permutations of the embodiments and methods will be apparent to those skilled in the art. For example, while the usage of 2 cameras for depth calculation is described in some detail, depth information may be extracted from multiple (>2) cameras as well. The disclosure is to be understood as not limited by the specific embodiments described herein.

All references mentioned in this application are hereby incorporated by reference in their entirety for all purposes set forth herein. It is emphasized that citation or identification of any reference in this application shall not be construed as an admission that such a reference is available or admitted as prior art.

The invention claimed is:

1. A method, comprising:
obtaining respective image information by applying an imaging system having a first camera with a first field of view (FOV) and a second camera with a second FOV smaller than the first FOV, wherein the first FOV and the second FOV overlap over an overlap region;
calculating a stereoscopic depth map in the overlap region using the respective image information provided by the first and second cameras;
obtaining a first camera 2 sub-pixel phase detection (2PD) disparity map in the entire first FOV; and
generating a calibrated 2PD depth map in the entire first FOV to improve the stereoscopic depth map or a 2PD depth map in at least the overlap region based on the stereoscopic depth map in the overlap region and the first camera 2PD disparity map in the entire first FOV.

2. The method of claim 1, wherein the generating the calibrated 2PD depth map in the entire first FOV to improve the stereoscopic depth map or the 2PD depth map in at least the overlap region includes using the stereoscopic depth map in the overlap region ands the first camera 2PD disparity map in the entire first FOV.

3. The method of claim 2, wherein the calculating a stereoscopic depth map in the overlap region includes calculating an absolute stereoscopic depth map in the overlap region.

4. The method of claim 3, wherein the calculating an absolute stereoscopic depth map in the overlap region includes cropping the image information provided by the first camera to match the second FOV so that disparity at infinity is zero.

5. The method of claim 4, wherein the using the stereoscopic depth map in the overlap region and the first camera 2PD disparity map in the entire first FOV includes converting disparities in the first camera 2PD disparity map in the entire first FOV from pixel units into calibrated physical units based on the calibrated result of a stereo disparity.

6. The method of claim 1, wherein the generating the calibrated 2PD depth map in the entire first FOV to improve the stereoscopic depth map or the 2PD depth map in at least the overlap region includes using the 2PD depth map to improve the stereoscopic depth map in the overlap region.

7. The method of claim 6, wherein the obtaining the 2PD depth map in the entire first FOV includes obtaining the 2PD depth map using a first camera image sensor.

8. The method of claim 6, wherein the obtaining the 2PD depth map in the entire first FOV includes obtaining the 2PD depth map using a first camera image sensor and a second camera image sensor.

9. A method comprising:
obtaining respective image information by applying an imaging system having a first camera with a first field of view (FOV) and a second camera with a second FOV smaller than the first FOV, wherein the first FOV and the second FOV overlap over an overlap region;

calculating a stereoscopic depth map in the overlap region using the respective image information provided by the first and second cameras;
obtaining a first camera 2 sub-pixel phase detection (2PD) disparity map in the entire first FOV; and
generating a calibrated 2PD depth map in the entire first FOV to improve a 2PD depth map in at least the overlap region based on the stereoscopic depth map in the overlap region and the first camera 2PD disparity map in the entire first FOV.

* * * * *